United States Patent

[11] 3,609,125

[72] Inventors Yoshihisa Fujimoto;
 Yoshio Kimura; Iwao Terasaki; Takanobu Kitago, all of Nobeoka-shi, Japan
[21] Appl. No. 817,938
[22] Filed Apr. 21, 1969
[45] Patented Sept. 28, 1971
[73] Assignee Asahi Kasei Kogyo Kabushiki Kaisha
 Osaka, Japan
[32] Priority Apr. 24, 1968
[33] Japan
[31] 27090

[54] POLYESTERIFICATION PROCESS AND APPARATUS
 3 Claims, 4 Drawing Figs.
[52] U.S. Cl. ................................................. 260/75,
 23/283, 23/285
[51] Int. Cl. ............................................. C08g 17/01
[50] Field of Search ...................................... 260/75 M;
 23/283; 261/114

[56] References Cited
UNITED STATES PATENTS

| | | | | |
|---|---|---|---|---|
| 2,776,822 | 1/1957 | Ortegren | | 261/114 |
| 2,789,803 | 4/1957 | Doty | | 261/114 |
| 2,829,153 | 4/1958 | Vodonik | | 260/470 |
| 2,905,707 | 9/1959 | Hurt et al. | | 260/475 |
| 3,054,776 | 9/1962 | Higgins | | 260/75 |
| 3,233,879 | 2/1966 | Mitchell | | 261/79 |
| 3,277,060 | 10/1966 | Bell et al. | | 260/75 |

*Primary Examiner*—William H. Short
*Assistant Examiner*—Melvin Goldstein
*Attorney*—Robert D. Flynn

ABSTRACT: A process for producing polymers of medium degree of polymerization from polymerizable liquid, which comprises continuously passing the polymerizable liquid and vaporous byproducts through a vertical series of reaction zones, each maintained at a temperature to promote polymerization, successively from the uppermost reaction zone to the lowermost reaction zone by pressure difference between the vaporous byproducts in the adjacent reaction zones and gravity of the liquid, and causing said liquid and vaporous byproducts to flow as a stream from the upper reaction zone onto the liquid surface in the lower reaction zone, said stream being so directed as to produce rotating current in the liquid in said lower reaction zone, whereby agitation of said liquid is produced; and an apparatus for carrying out the above process, comprising a reaction vessel including a vertical series of reaction chambers each having bottom and sidewalls, an inlet connected to the uppermost chamber to supply the polymerizable liquid into the vessel, an outlet connected to the lowermost chamber to discharge polymerized liquid and vaporous byproducts from the vessel, and connecting tubes each connecting one of the chambers with the one located immediately therebelow, each of said connecting tubes having its upper end situated above the bottom wall of the upper chamber so as to define depth of the liquid contained therein and its lower end situated above the surface of the liquid contained in the lower chamber and so directed as to produce rotating current in the liquid.

PATENTED SEP28 1971 3,609,125
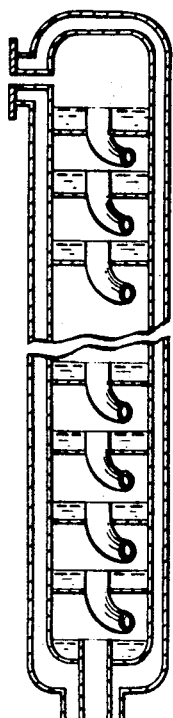
FIG. 4
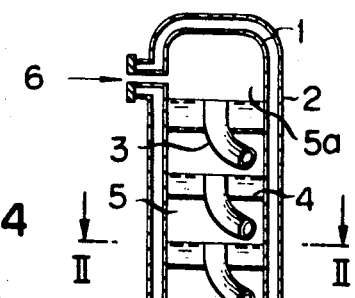
FIG. 1
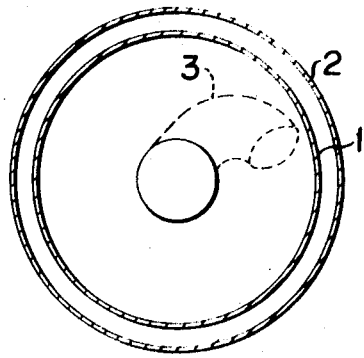
FIG. 2
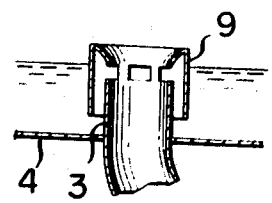
FIG. 3
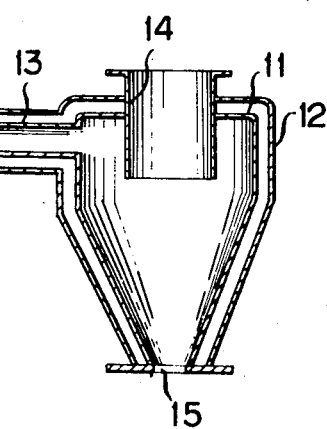

POLYESTERIFICATION PROCESS AND APPARATUS

BACKGROUND OF THE INVENTION

The present invention relates to a process and an apparatus for producing polymers of medium degree of polymerization, such as 10 to 20, and, more particularly, a process and an apparatus for producing polyesters of medium degree of polymerization by continuously polymerizing β-hydroxy-ethyl terephthalate with or without suitable comonomers or low molecular weight polymers of β-hydroxy-ethyl terephthalate.

Although the present invention is particularly applicable to the production of polyester of medium degree of polymerization and will be explained with reference thereto, it has more broad applications in polymerization process.

In the production of polyester of medium degree of polymerization, polymerizable liquid is passed through a vertical series of reaction zones from the uppermost zone downward to the lowermost zone. The polymerizable liquid is maintained at the temperature about 260°–280° C. and is subjected to gradually decreasing pressure from about 100 mm. Hg. in the uppermost reaction zone to about 10 mm. Hg. in the lowermost reaction zone, while it is agitated for a predetermined time in the respective reaction zone, whereby the polymerizable liquid gradually polymerizes to produce the polymerized liquid of medium degree of polymerization. The polymerized liquid thus obtained may be fed to a finisher thereafter.

Heretofore an attempt has been made to perform the agitation of the polymerizable liquid by admixing vaporous byproducts into the liquid, without using mechanical agitating means. Examples of such a construction are shown in the specification of U.S. Pat No. 2,727,882 and U.S. Pat. No. 3,54,776. In the construction as disclosed in U.S. Pat. No 2,727,882, the polymerization apparatus comprises a plurality of superimposed reaction chambers and communicating passages each connecting the adjacent pair of the reaction chambers. In operation, polymerizable liquid in the lower reaction chamber is upward through the communicating passage to the upper reaction chamber so that it is supplied onto the polymerizable liquid contained in said upper chamber. The liquid retained in said upper reaction chamber is urged from its surface layer into the next communicating passage through a slit at the end of said passage and then it fed upward through said passage into the next upper reaction chamber. During the upward movement the liquid is subjected to agitating action due to admixing of ethylene glycol vapor.

Such a construction has some disadvantages. Firstly, it is likely to produce dead spaces in the reaction chambers, because a complete agitation can hardly be obtained if the depth of the liquid contained in the reaction chamber is increased and/or the viscosity of the liquid is increased. According to our test, it has been found that the depth of the liquid should be less than 1 cm. in order to prevent the occurrence of such dead spaces. Even if the depth is maintained below 1 cm., dead spaces can still occur at the points remote from the area between the inlet and outlet of the passages opening therein. Furthermore, the decrease of the liquid depth results in decrease of space utilization (ratio of total volume of liquid contained in reaction vessel and that of said reaction vessel).

Secondly, the construction shown in said patent has a problem in designing a commercial equipment of large capacity, even if a good result has been obtained in a test equipment having relatively small capacity. In designing a commercial equipment it has been the common practice to use same number of reaction zones and same pressure distribution of the reaction zones as those used in the test equipment. When the pressure in the uppermost reaction zone of the commercial equipment is equal to that of the test equipment, the pressure difference between the adjacent reaction zones in the former should be selected to be equal to the corresponding pressure differences in the latter so that the pressures in the respective reaction zones in the commercial equipment are equal to those in the corresponding reaction zones in the test equipment. A pressure difference between the adjacent reaction zones is considered to be proportional to the sum of the resistance applied on the vapor when it passes through the restricted slit at the lower end of the communicating passage (referred to as "resistance 1") and the resistance when the vapor passes through the mass of liquid in the passage (referred to as "resistance 2"). The width of said slit in the commercial equipment should be, of course, identical with that in the test equipment. In order to make the resistance 1 in the former to the equal to that in the latter, it is necessary that the flowing rates of the vapor through the slit are equal with each other. Now assuming that the commercial equipment has a capacity $m$ times larger than that of the test equipment, the diameter of the communicating passage of the former should be $m$ timer larger than that of the latter. In a commercial plant, it is inevitable to increase the number of passage tubes in proportion to the capacity. However, it would be quite difficult to equalize the flow of the reaction liquids and vaporous byproducts in each individual passage tube provided in great numbers, particularly, in this type of reaction equipment.

Thirdly, the liquid is conveyed upward be the action of the ethylene glycol vapor, so that the surface of the liquid always waves, causing variation in the pressure difference between the adjacent zones as large as 30 percent. Thus stable operation cannot be obtained.

In the construction as disclosed in U.S. Pat. No. 3,054,776, the liquid depth in the respective reaction zones cannot be increased above a given value, in order to decrease the pressure difference between the adjacent reaction zones, and as the capacity of the apparatus in increased, the thermal transferring area per unit weight of the polymerizable liquid is decreased so that heat cannot be supplied sufficient to promote the reaction. The space utilization is also relatively low.

SUMMARY OF THE INVENTION

It is an object of the present invention to provide polymerization process and apparatus which overcome the above mentioned problems.

It is another object of the invention to provide polymerization process and apparatus in which pressure difference between adjacent reaction zones is maintained at relatively low value even in a large commercial equipment.

It is another object of the invention to provide polymerization process and apparatus in which polymerizable liquid is effectively agitated by vaporous byproducts ejecting onto the liquid so as to impart rotary movement thereto and improve the thermal conduction between the wall of the reaction vessel and the liquid contained therein, thereby supplying evaporation heat to the vaporous byproducts by the polymerization reaction, so that the polymerized liquid maintains its constant quality.

In accordance with the present invention there is provided a process for producing polymers of medium degree of polymerization from polymerizable liquid, which comprises continuously passing the polymerizable liquid and vaporous byproducts through a vertical series of reaction zones, each maintained at a temperature to promote polymerization, successively from the uppermost reaction zone to the lowermost reaction zone by pressure difference between the vaporous byproducts in the adjacent reaction zones and gravity of the liquid, and causing said liquid to flow as a stream from the upper reaction zone into the liquid in the lower reaction zone, said stream being so directed as to produce rotating current in the liquid in said lower reaction zone, whereby agitation of said liquid is produced.

Further in accordance with the present invention there is provided an apparatus for producing polymers of medium degree of polymerization from polymerizable liquid, comprising a reaction vessel including a vertical series of reaction chambers each having bottom and sidewalls, an inlet connected to the uppermost chamber to supply the polymerizable liquid into the vessel, an outlet connected to the lowermost chamber to discharge polymerized liquid and vaporous byproducts from the vessel, and connecting tubes each connecting one of the chambers with the one located immediately therebelow, each of said connecting tubes having its upper end situated above the bottom wall of the upper chamber so as to define depth of the liquid contained therein and its lower end situated above the surface of the liquid contained in the lower chamber and so directed as to produce rotating current in the liquid.

BRIEF DESCRIPTION OF THE DRAWINGS

The drawings illustrate preferred embodiments of the present invention, in which:

FIG. 1 is a longitudinal section of the polymerization apparatus according to the present invention;

FIG. 2 is an enlarged section taken along line II—II in FIG. 1;

FIG. 3 is a longitudinal section of upper portion of a modified form of the connecting tube of the polymerization apparatus; and FIG. 4 is a section of the polymerization apparatus, showing another embodiment of the present invention.

DESCRIPTION OF THE PREFERRED EMBODIMENT

Referring to FIG. 1, the polymerization apparatus according to the present invention comprises a reaction vessel having a wall 1 formed with a jacket 2 for heating the interior of the vessel and divided into a plurality of chamber 5 having a bottom 4. The jacket 2 may be formed of a plurality of sections. The reaction vessel has an inlet 6 for supplying polymerizable liquid into the vessel and, an outlet 8 for discharging the polymerized liquid therefrom. The respective chamber 5 is connected with the one located immediately therebelow, through a helical connecting tube 3. Usually, the connecting tube 3 has a diameter one-sixth —one-fourth times smaller than that of the reaction vessel 1. The reaction vessel has an outlet 7 connected to a vacuum source to discharge the vaporous byproducts, ethylene, glycol vapor, from the vessel.

With respect to polymerizing bis-2-hydroxy-ethyl terephthalate, the vapors present in the column consist essentially of vaporous ethylene glycol. Very small amounts of vapors of bis-2-hydroxy-ethyl terephthalate and dimethyl terephthalate are present. Generally, the amount of dimethyl terephthalate in the feed to the column should be less than about 0.2 percent based upon the weight of the total feed, and no more than 0.5 percent should be present. The components of the column which are present in the liquid phase consist of bis-2-hydroxy-ethyl terephthalate and ethylene glycol. The total amount of ethylene glycol in the column, both in the gaseous and liquid phases, results from glycol fed into the column with the ester monomer and that which is formed as a result of the condensation reaction.

A centrifugal separator may be used to separate and remove the vaporous byproducts from the polymerized liquid, as shown in FIG. 4. The embodiment shown in FIG. 4 comprises a body 11 of centrifugal separator, a jacket 12, an inlet 13 for introducing the mixture of the polymerized liquid and the vaporous byproducts, an outlet 14 for discharging the vaporous byproducts separated from the mixture and an outlet 15 for discharging the liquid.

The connecting tube 3 has its upper end situated above the bottom 4 of the chamber 5 and the upwardly projecting length of said connecting tube above the bottom 4 defines the depth of the polymerizable liquid contained in the chamber.

The ratio of the distances between the inner side of the wall of the reaction vessel and the outer surface of the connecting tube and the distance between the upper end of the connecting tube and the bottom wall of said reaction chamber is preferably selected to be about 2:1. The connecting tube 3 has its lower open end 3a situated above the level of the liquid contained in the chamber. The open lower end 3a is directed at an angle to the surface of the liquid and located near the wall 1 of the reaction vessel, so that the jet stream from the open end 3a of the connecting tube flows along the inside surface of the chamber and strikes on the surface of the liquid to impart rotating movement thereto.

Preferably, the upper end of the connecting tube 3 is flared upwardly so as to reduce the resistance. In order to prevent the short-circuiting of the polymerizable liquid, a guide cap may be attached to the upper end of the connecting tube, as shown in FIG. 3, whereby the liquid flows along the surface of the bottom 4 to the outside of the connecting tube and then passes upward between the guide cap 9 and the outside surface of the connecting tube into the top opening of the latter.

The polymerizable liquid, which has been heated to the temperature 200–265° C., flows into the uppermost chamber 5a at the pressure 100–40 mm. Hg. The liquid flows downward through the chambers 5 having successively decreased pressure. While descending, the polymerizable liquid generates vaporous byproducts, which helps to produce rotating current of the liquid in the respective chambers. Both the vaporous byproducts and the liquid flow through the helical connecting tubes. While the liquid is flowing downward from the inlet 6 to the outlet 8, it is polymerized to the predetermined degree, and flows out of the vessel form the last chamber 5a at the temperature 270°–285° C. and the pressure lower than 30 mm. Hg.

Example

To a continuous ester-interchange reaction vessel was continuously supplied a feed in such a proportion that it consisted of 100parts by weight of dimethyl terephthalate (DMT), 70 parts by weight of ethylene glycol and 0.048 part by weight of manganese acetate to effect an ester-interchanging reaction therein for obtaining 2-hydroxy-cthyl terephthalate and a mixture of low molecular weight polymers thereof. After 0.035 part by weight of antimony trioxide and phosphorous acid, respectively, based on the weight of the reaction product were continuously added to the reaction product, the resulting reaction mixture was supplied continuously to an inlet 6 located at the uppermost chamber of the prepolymerization reaction vessel, as shown in FIG. 1, vessel being 250 mm. the internal diameter of the connecting tube being 32 mm., and the distance between the upper end of the connecting tube and the bottom of the chamber being 32mm. The reaction vessel is reduced in pressure, and the lowermost chamber is maintained at the pressure of 6 mm. Hg. The jacket is divided in two sections, upper and lower sections, to which different heating media (e.g., "Dowtherm A" or p-cymene) are supplied respectively. The byproduct ethylene glycol vapor is separated from the polymerized liquid in the lowermost chamber and discharged from the nozzle 7. The polymerized liquid is removed from the outlet 8, and then it is fed to a finisher maintained at the pressure of 0.5 mm. Hg. and the temperature of 285 ° C., in which the liquid is subjected to polymerization for 3 hours. The result is shown in table I.

TABLE I

|  | 1 | 2 | 3 | 4 |
|---|---|---|---|---|
| Rate of feed of DMT (kg./hr.) | 22.2 | 25.6 | 30.0 | 37.5 |
| Rate of evolution of methanol (kg./hr.) | 7.4 | 8.5 | 10.0 | 12.5 |
| Temperature of ester-interchange reaction product (° C.) | 240 | 238 | 242 | 241 |
| Uppermost chamber: |  |  |  |  |
| Temperature (° C.) | 262 | 260 | 260 | 257 |
| Pressure (mm. Hg) | 55 | 67 | 76 | 92 |
| Lowermost chamber: |  |  |  |  |
| Temperature (° C.) | 275 | 273 | 270 | 265 |
| Pressure (mm. Hg) | 6 | 6 | 6 | 6 |
| Hold-up time (min.) | 77 | 67 | 57 | 46 |
| Viscosity of reaction product in lowermost chamber ($\eta_{rel}$) [1] | 2.21 | 2.07 | 1.90 | 1.75 |
| Viscosity of reaction product from finisher ($\eta_{sp}/c$) [2] | 0.68 | 0.65 | 0.61 | 0.57 |

[1] $\eta_{rel}$ o-chlorophenol 2% at 35° C.
[2] $\eta_{sp}/c$ o-chlorophenol — at 35° C.

We claim:

1. A process for producing polymers of a medium degree of polymerization by continuously polymerizing polymerizable liquid β-hydroxy-ethyl terephthalate, which comprises feeding the polymerizable liquid to an uppermost zone of a vertical series of reaction zones which are maintained at a pressure of from 100 mm. Hg. to 10 mm. Hg., and successively passing said polymerizable liquid from the upper reaction zone to an adjacent lower reaction zone by pressure difference of vaporous byproduct between the adjacent reaction zones and the gravity of the liquid, through a helical connecting tube having its outlet situated above the level of the liquid in the lower reaction zone and directed to produce a rotating current in the liquid in said lower reaction zone by a stream issuing from said outlet.

2. Process of claim 1, wherein said polymers comprise 10 to 20 units of β-hydroxy-ethyl terephthalate.

3. Process of claim 1, wherein said reaction zones are at a temperature of from 200° C. to 285° C.

UNITED STATES PATENT OFFICE
CERTIFICATE OF CORRECTION

Patent No. 3,609,125            Dated September 28, 1971

Inventor(s) YOSHIHISA FUJIMOTO et al

It is certified that error appears in the above-identified patent and that said Letters Patent are hereby corrected as shown below:

Column 1, line 34 - "3,54,776" should be "3,054,776".

Column 2, line 10 - before "equal" delete "the" and replace with ---be---.

Column 2, line 15 - "$m$ timer" should be "$m$ times".

Column 2, line 21 - after "upward" delete "be" and replace with ---by---.

Column 3, line 41 - delete comma (,) after "ethylene".

Column 4, line 8 - after "cap" insert ---9---.

Column 4, line 25 - "5a" should be deleted and replaced with ---5b---.

Column 4, line 42 - after "FIG.1" insert ---having 20 reaction chambers, the internal diameter of the---.

Signed and sealed this 20th day of June 1972.

(SEAL)
Attest:

EDWARD M. FLETCHER, JR.
Attesting Officer

ROBERT GOTTSCHALK
Commissioner of Patents